United States Patent
Zhang et al.

(10) Patent No.: US 12,140,779 B2
(45) Date of Patent: Nov. 12, 2024

(54) REFLECTIVE DIFFUSER FOR REDUCING LASER SPECKLE AND REFLECTIVE LUMINESCENT WHEEL INCLUDING SAME

(71) Applicant: MATERION PRECISION OPTICS (SHANGHAI) LIMITED, Pudong Shanghai (CN)

(72) Inventors: Wen Bo Zhang, Shanghai (CN); Xiaohua Yang, Shanghai (CN)

(73) Assignee: MATERION PRECISION OPTICS (SHANGHAI) LIMITED, Shanghai (CN)

( * ) Notice: Subject to any disclaimer, the term of this patent is extended or adjusted under 35 U.S.C. 154(b) by 288 days.

(21) Appl. No.: 17/642,294

(22) PCT Filed: Sep. 16, 2019

(86) PCT No.: PCT/CN2019/105920
§ 371 (c)(1),
(2) Date: Mar. 11, 2022

(87) PCT Pub. No.: WO2021/051226
PCT Pub. Date: Mar. 25, 2021

(65) Prior Publication Data
US 2022/0350159 A1    Nov. 3, 2022

(51) Int. Cl.
*G03B 21/20* (2006.01)
*G02B 5/02* (2006.01)
(Continued)

(52) U.S. Cl.
CPC .......... *G02B 27/48* (2013.01); *G02B 5/0221* (2013.01); *G02B 26/008* (2013.01); *G03B 21/204* (2013.01)

(58) Field of Classification Search
CPC ...... G03B 21/204; G02B 27/48; G02B 5/021; G02B 5/0221
See application file for complete search history.

(56) References Cited

U.S. PATENT DOCUMENTS

| 2010/0142041 A1 | 6/2010 | Berman |
| 2013/0010353 A1 | 1/2013 | Berman |

(Continued)

FOREIGN PATENT DOCUMENTS

| CN | 204387958 U | 6/2015 |
| CN | 105404083 | 3/2016 |

(Continued)

OTHER PUBLICATIONS

PCT/CN2019/105920; International Search Report; mailed Jun. 16, 2020; 4 pages.

(Continued)

*Primary Examiner* — Ryan D Howard
(74) *Attorney, Agent, or Firm* — Tucker Ellis LLP

(57) ABSTRACT

Provided is a diffuser for de-speckling laser light. The diffuser includes a transparent diffuser substrate with de-speckling microstructures disposed on or formed into a first (i.e. front) side of the transparent diffuser substrate, and a reflective film coated onto an opposite second (i.e. back) side of the transparent diffuser substrate. An extinction layer may be coated onto the reflective film. An anti-reflection (AR) coating may be disposed on the first side of the transparent diffuser substrate. Also provided is a luminescent wheel including a disk and an optical ring that includes at least one fluorescent segment and the aforementioned diffuser. The optical ring is secured to the disk so as to rotate with the disk.

21 Claims, 5 Drawing Sheets

(51) Int. Cl.
*G02B 26/00* (2006.01)
*G02B 27/48* (2006.01)

(56) References Cited

U.S. PATENT DOCUMENTS

| | | | |
|---|---|---|---|
| 2014/0092471 A1 | 4/2014 | Tetsuya et al. | |
| 2015/0301438 A1* | 10/2015 | Akiyama | G03B 21/204 362/19 |
| 2016/0004138 A1 | 1/2016 | Kun-Liang et al. | |
| 2016/0349606 A1 | 12/2016 | Takehiro et al. | |
| 2017/0127026 A1 | 5/2017 | Hsu | |
| 2017/0269464 A1 | 9/2017 | Chia-Lun et al. | |
| 2019/0049828 A1 | 2/2019 | Maeda | |
| 2019/0101813 A1 | 4/2019 | Takeshi | |

FOREIGN PATENT DOCUMENTS

| | | |
|---|---|---|
| CN | 105404083 A | 3/2016 |
| CN | 105549312 | 5/2016 |
| CN | 105549312 A | 5/2016 |
| CN | 108255006 | 7/2018 |
| CN | 108255006 A | 7/2018 |
| CN | 207742457 U | 8/2018 |
| CN | 109061895 | 12/2018 |
| CN | 109061895 A | 12/2018 |
| CN | 109752904 A | 5/2019 |
| CN | 109870799 | 6/2019 |
| CN | 109870799 A | 6/2019 |
| JP | 2014149513 A | 8/2014 |
| JP | 2017181603 A | 10/2017 |
| JP | 2018045199 A | 3/2018 |
| JP | 2018512617 A | 5/2018 |
| JP | 2018132547 A | 8/2018 |
| JP | 2019032352 A | 2/2019 |
| JP | 2020197621 A | 12/2020 |
| TW | 201632978 A | 9/2016 |
| WO | 2015122075 A1 | 8/2015 |
| WO | 2016181858 A1 | 11/2016 |

OTHER PUBLICATIONS

PCT/CN2019/105920; Written Opinion of the International Searching Authority; mailed Jun. 16, 2020; 4 pages.
Japanese Search Report dated Mar. 6, 2023 for Application Serial No. 2022-516722 (27 pages).
Chinese Search Report dated Mar. 30, 2023 for Application Serial No. 2019801004655 (2 pages).
Supplemental European Search Report dated Apr. 28, 2023 for Application Serial No. EP19946070.
Supplemental Written Opinion dated Apr. 28, 2023 for Application Serial No. EP19946070.
Taiwanese Search Report dated Feb. 29, 2014 for Application Serial No. 109130188 (2 pages).

* cited by examiner

REFLECTIVE DIFFUSER FOR REDUCING LASER SPECKLE AND REFLECTIVE LUMINESCENT WHEEL INCLUDING SAME

CROSS-REFERENCE TO RELATED APPLICATIONS

This application is a national phase application of International Application No. PCT/CN2019/105920, filed Sep. 16, 2019, which is incorporated herein by reference in its entirety.

FIELD OF USE

The following disclosure relates to the optical arts, laser illumination arts, luminescent wheel arts, and related arts.

BACKGROUND

A luminescent wheel includes a disk having fluorescent segments disposed on the periphery of the disk, and a motor connected to rotate the disk. In use, a laser beam is directed onto the periphery of the rotating disk. The laser light is converted to fluorescent (i.e. wavelength-converted) light by the fluorescent segments. Commercial luminescent wheels typically employ a reflective arrangement in which the disk is made of a reflective material such as metal or has a reflective coating on the side supporting the fluorescent segments. One commercial application of luminescent wheels is in optical projectors. In principle, by having fluorescent segments that emit red, green, and blue converted light disposed around the periphery of the wheel, the output would be a sequence of red, green, and blue illumination, which can be synced with red, green, and blue pixel patterns defined by a micro-electro-mechanical DLP reflector or other suitable image-forming technology to project a time-averaged full color image.

However, the photon energy of the laser light exciting the fluorescent segments should be higher than the photon energy of the wavelength-converted light. This means that using a blue fluorescent segment would require using an ultraviolet laser. A more usual design is to instead employ a blue laser and a luminescent wheel with red and green fluorescent segments and light-transmissive segments. The blue laser light then passes through the light transmissive segments to provide the blue light component of the red, green, and blue illumination sequence.

One difficulty with this design is that the blue laser light has a speckle pattern caused by mutual interference of wavefronts of the coherent laser beam. This speckle pattern is undesirable in the blue illumination component. Accordingly, it is known to add a diffuser in the optical path of the light-transmissive segments to eliminate speckle. The diffuser is typically made by etching on glass substrates to form microstructures. When the laser beam impinges on the diffuser, the microstructures of the diffuser introduce scattering to eliminate the interference characteristics of the laser and achieve the purpose of reducing or eliminating the speckle. The diffuser substrate generally is glass or quartz or light-transmissive ceramic.

Some improvements are disclosed herein.

BRIEF SUMMARY

In accordance with some illustrative embodiments disclosed herein, a luminescent wheel comprises a disk that is connectable with a motor to rotate the disk, and an optical ring secured to the disk so as to rotate with the disk. The optical ring includes at least one fluorescent segment and at least one diffuser segment. Each fluorescent segment is configured to convert laser light at an excitation wavelength to converted light. Each diffuser segment includes a transparent diffuser substrate having a reflective film coated onto a backside of the transparent diffuser substrate. The transparent diffuser substrate may have microstructures disposed on or formed into a front side of the transparent diffuser substrate and configured to de-speckle the laser light at the excitation wavelength, and may further have an anti-reflection (AR) coating disposed on the front side that is anti-reflective for the laser light at the excitation wavelength. Each diffuser segment may further comprise an extinction layer coated onto the reflective film and configured to block the laser light at the excitation wavelength.

In accordance with some illustrative embodiments disclosed herein, a diffuser for de-speckling laser light is disclosed. The diffuser comprises: a transparent diffuser substrate having a first (i.e. front) side and a second (i.e. back) side opposite the first side; microstructures disposed on or formed into the first side of the transparent diffuser substrate and configured to de-speckle the laser light; and a reflective film coated onto the second side of the transparent diffuser substrate. An optical interface defined at a junction of the second side of the transparent diffuser substrate and the reflective film has a reflectivity of at least 96% for the laser light. The diffuser may optionally further comprise an extinction layer coated onto the reflective film and configured to block the laser light, and/or an AR coating disposed on the first side of the transparent diffuser substrate that is anti-reflective for the laser light.

In accordance with some illustrative embodiments disclosed herein, a luminescent wheel comprises a disk that is connectable with a motor to rotate the disk, and an optical ring secured to the disk so as to rotate with the disk. The optical ring includes at least one fluorescent segment and a diffuser as set forth in the immediately preceding paragraph. Each fluorescent segment is configured to convert the laser light to converted light having a different spectrum than the laser light.

In accordance with some illustrative embodiments disclosed herein, a method of manufacturing a diffuser for de-speckling laser light is disclosed. The method comprises: forming microstructures onto a first (i.e. front) side of a transparent diffuser substrate which are configured to de-speckle the laser light; and coating a second (i.e. back) side of the transparent diffuser substrate opposite from the first side with a reflective film. The method may further include depositing an extinction layer onto the reflective film. The method may further include depositing an anti-reflection coating onto the first side of the transparent diffuser substrate that is anti-reflective for the laser light.

BRIEF DESCRIPTION OF THE DRAWINGS

The drawings are presented for purposes of illustrating the exemplary embodiments disclosed herein and not for purposes of limiting the same.

DETAILED DESCRIPTION

Figure 1:
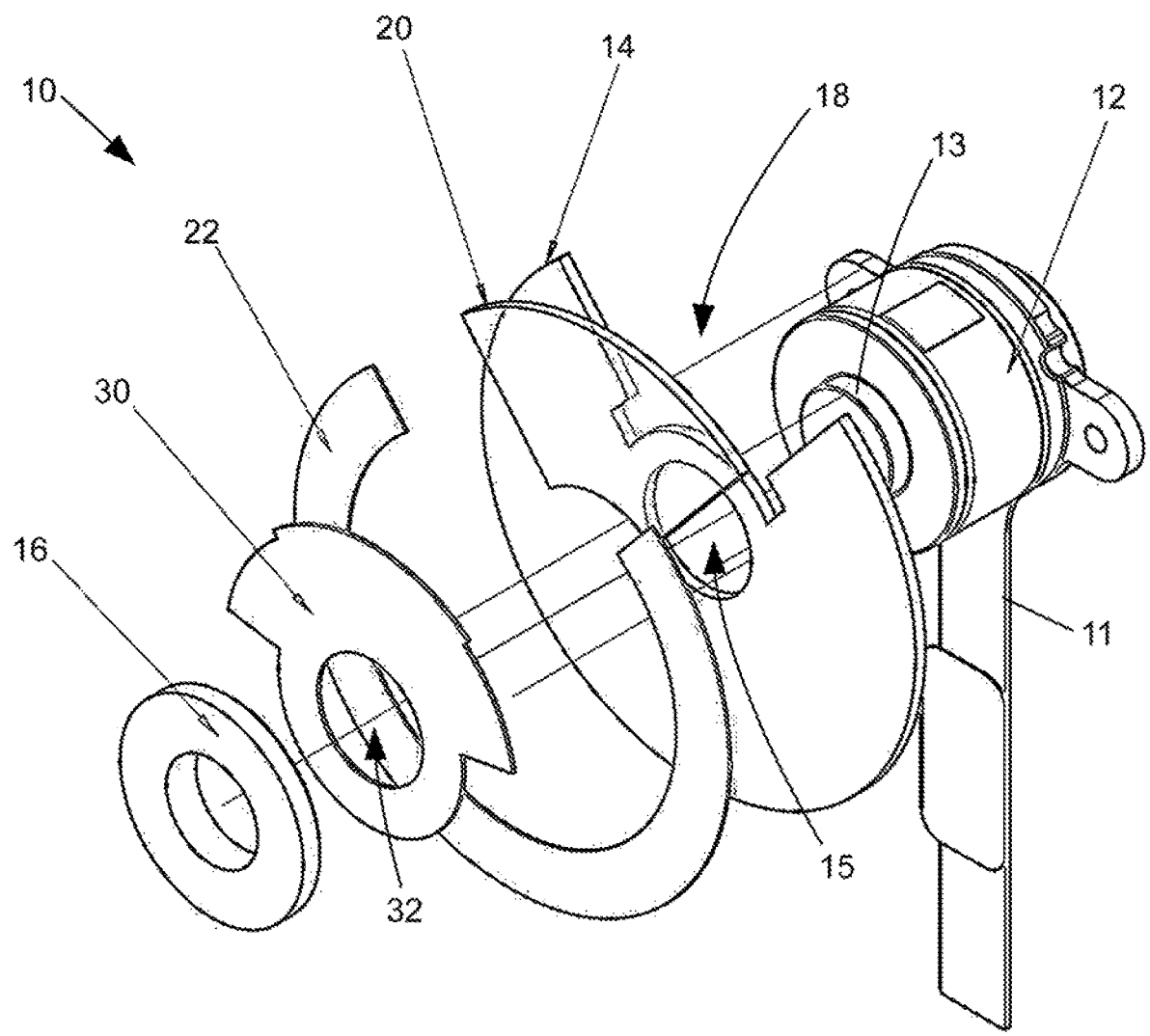
FIG. 1 diagrammatically shows an exploded perspective view of a luminescent wheel.

A more complete understanding of the processes and apparatuses disclosed herein can be obtained by reference to the accompanying drawings. These figures are merely schematic representations based on convenience and the ease of demonstrating the existing art and/or the present development, and are, therefore, not intended to indicate relative size and dimensions of the assemblies or components thereof. The present disclosure may be understood more readily by reference to the following detailed description of desired embodiments and the examples included therein. In the following specification and the claims which follow, reference will be made to a number of terms which shall be defined to have the following meanings. The singular forms "a," "an," and "the" include plural referents unless the context clearly dictates otherwise. Numerical values in the specification and claims of this application should be understood to include numerical values which are the same when reduced to the same number of significant figures and numerical values which differ from the stated value by less than the experimental error of conventional measurement technique of the type described in the present application to determine the value. All ranges disclosed herein are inclusive of the recited endpoints.

As previously noted, a known luminescent wheel design employs red and green fluorescent segments and transmissive segments, and is used in conjunction with a blue laser. Sequential light cycling between red, green, and blue (or some other ordering, e.g. green, red, and blue) is thereby provided. However, this known design has a substantial disadvantage. The fluorescent segments operate in reflection mode (actually, the converted fluorescence is usually emitted in an approximately Lambertian pattern, but as the disk is metal or otherwise opaque the resulting fluorescent illumination approximates diffuse reflection); whereas, the blue light is produced by transmission of the laser beam through the light transmissive segments. This means that additional optical components are required to redirect and combine the divergent optical paths of the diffuse "reflected" fluorescent red and green light and the transmitted direct blue light to form the final sequential illumination output. The additional optics, in turn, increase the size and complexity of the sequential color illumination source.

To avoid the need for the additional optical path, the diffuser could be attached to the reflective disk, so that the de-speckled blue light is also emitted in reflection mode. In this case, there are no light transmissive segments; rather, the diffuser segments are adhered to the disk. When the rotation of the disk brings a blue segment into contact with the laser beam, the blue laser beam passes through the diffuser (thereby being de-speckled), reflects off the reflective disk, and passes back through the diffuser. However, this approach also has disadvantages.

First, optical losses are high. The reflectivity of the high temperature-resistant disk substrate is typically only about 95%. Furthermore, the blue laser beam passes through the adhesive twice. If silicone is used as the adhesive, then the transmissivity of the transparent silicone is about 98%. Hence the total efficiency is only 95%×(2×98%), i.e. about 91%, which decreases the utilization ratio of the blue laser light.

Second, there is a large density difference between glass, which is usually used for the diffuser, and silicone which is a common host for the fluorescent segments. This density difference can imbalance the rotating disk. As the disk typically rotates rapidly to achieve a high cycling frequency for the color illumination sequence, this imbalance can contribute to wear on the motor and/or disk wobble.

Third, the adhesive that secures the diffuser to the disk receives direct illumination from the blue laser beam. Silicone adhesive is typically used to adhere the fluorescent segments, because silicone is thermally resistant and the luminescent wheel is heated by the high power laser beam. The silicone adhesive securing the fluorescent segments does not experience direct laser beam irradiation, because the fluorescent segment absorbs most of that irradiation. However, if silicone is also used to adhere the diffuser segments, then aging of the silicone adhesive at the diffuser segments will be accelerated under the direct laser irradiation.

Fourth, the thermal conductivity of the transparent silicone is only about 0.2 W/m·K, which will lead to a temperature increase of luminescent wheel due to heat from the direct laser irradiation absorbed by the silicone adhesive at the diffuser segments.

Figure 3:
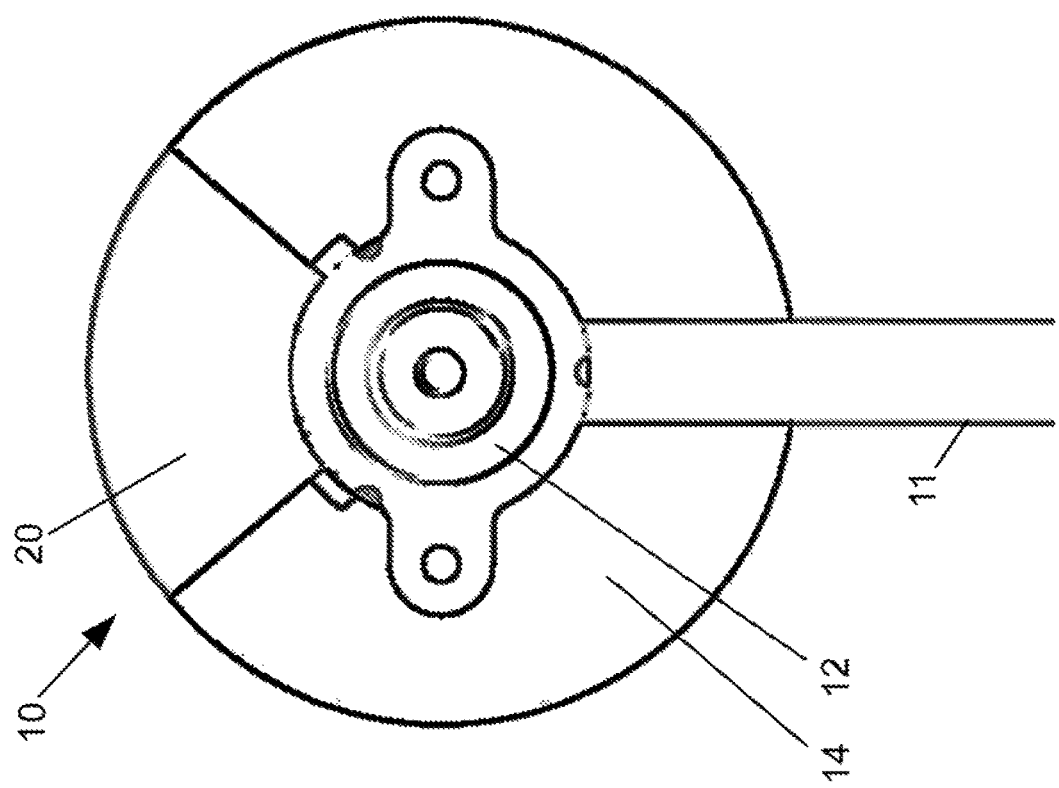
FIG. 3 diagrammatically shows the luminescent wheel of FIGS. 1 and 2 in an assembled rear view.
Figure 2:
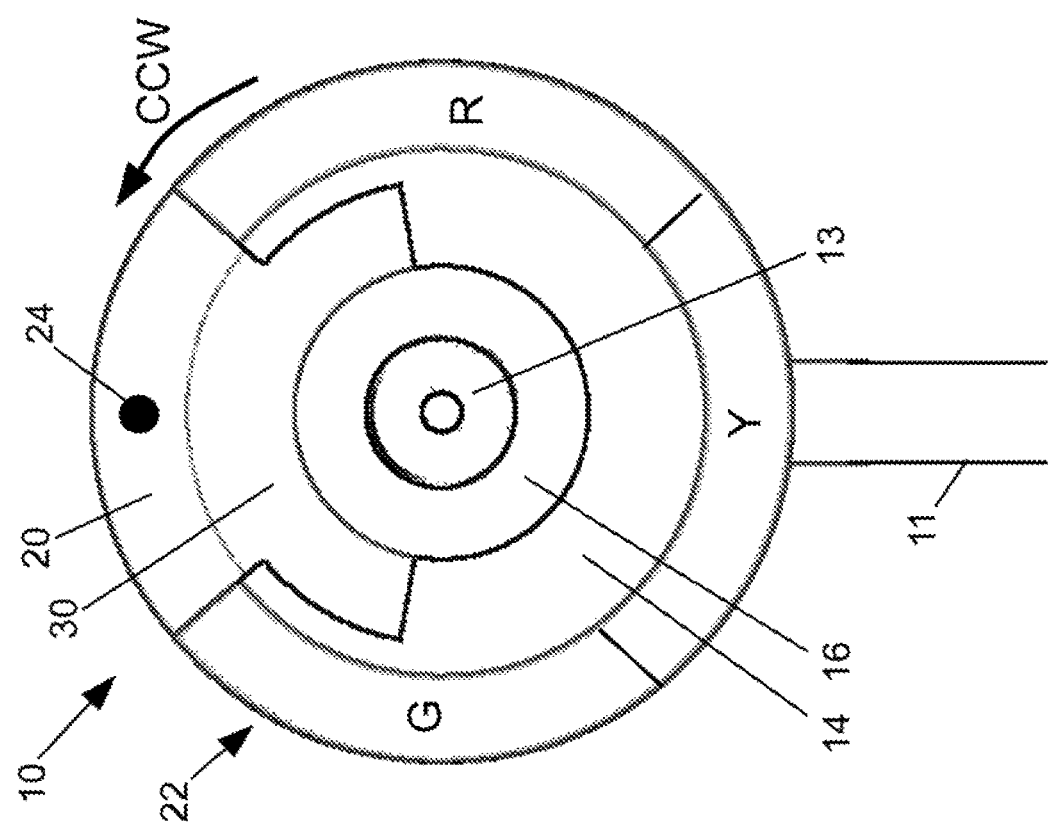
FIG. 2 diagrammatically shows the luminescent wheel of FIG. 1 in an assembled front view.

With reference now to FIGS. 1-3, a luminescent wheel is shown. FIG. 1 shows a luminescent wheel 10 in an exploded perspective view, while FIG. 2 shows the luminescent wheel in an assembled front view and FIG. 3 shows the luminescent wheel in an assembled rear view. An electrical cable 11 powers a motor 12 that drives the luminescent wheel via a driveshaft 13. A disk 14 has a central opening 15 that is connectable with the motor 12 and secured via a hub 16 to rotate the disk 14. The connection may be by way of bonding by glue, for example. The disk 14 includes a sector cutaway 18 that is aligned with a diffuser segment 20. At least one fluorescent segment 22. The diffuser segment 20 and the at least on fluorescent segment 22 collectively define an optical ring which is secured to the disk 14 so as to rotate with the disk 14. The optical ring includes at least one fluorescent segment 22 and at least one diffuser segment 20. As seen in FIG. 2, in the illustrative example there are three fluorescent segments 22: a red (R) fluorescent segment that emits converted red light, a green (G) fluorescent segment that emits converted green light, and a yellow (Y) fluorescent segment that emits converted yellow light. In the illustrative example there is a single diffuser segment 20. Each fluorescent segment 22 is configured to convert laser light emitted by a laser (not shown) at an excitation wavelength to converted light (e.g., converted red, green, and yellow light in the example). The diffuser segment 20 despeckles and reflects the laser light, which in the illustrative examples is blue laser light. In some embodiments suitable for providing sequential color illumination, the excitation wavelength of the laser light is a blue wavelength in a spectral range of 440-485 nm inclusive, and more preferably 440-460 nm inclusive, and each fluorescent segment 22 is configured (e.g., by comprising a suitable fluorescent powder dispersed in a host comprising a transparent material such as silicone) to convert the laser light at the blue wavelength to converted light having a spectrum with a largest peak in a spectral range of 460-800 nm inclusive, and more preferably 490-750 nm inclusive.

With particular reference to the front assembled view of FIG. 2, the laser light impinges on the optical ring at a spot 24 as a (optionally focused) laser beam. The laser is stationary. As the disk 14 rotates in a counter-clockwise (CCW) direction (as shown, or alternatively in a clockwise, CW, direction), the laser spot 24 moves (respective to the frame of reference of the disk 14) along a circular trajectory so as to successively impinge upon the successive fluorescent segments 22 and the diffuser segment 20. For the indicated converted light colors shown in FIG. 2, the resulting sequential color illumination is blue, red, yellow, green, blue, red, yellow, green, blue, red, yellow, . . . , where the blue light is produced when the laser spot 24 impinges on the diffuser segment 20. It will be appreciated that any sequence of colors can be obtained by suitable selection and arrangement of one or more fluorescent segments and one or more diffuser segments in the optical ring. Moreover, while the excitation wavelength of the laser light is described as blue light herein, the excitation light emitted by the laser may be of another wavelength.

The luminescent wheel of FIGS. 1-3 further includes the aforementioned hub 16 and a balance element 30, which has a central opening 32 that is aligned with the central opening 15 of the disk 14 and with the central opening of the hub 16. In the described example, the disk 14 is suitably made of aluminum or an aluminum alloy, and the balance element 30 is suitably made of steel or an aluminum alloy, although other materials are contemplated for these components. The balance element 30 is sometimes referred to herein as balance steel 30; however, other thermally conductive materials such as aluminum alloys or so forth may be used. The balance steel 30 extends radially outward a sufficient distance to overlap an inboard portion (i.e., "inboard" being closer to the central opening 15) of the diffuser segment 20, but does not extend radially outward to the outer perimeter of the disk 14. This leaves an exposed outboard portion of the diffuser segment 20 exposed, as best seen in the assembled front view of FIG. 2. The diffuser segment 20 fits into the sector cutaway 18 of the disk 14, and the inboard portion of the diffuser segment 20 is bonded to the back surface of the balance steel 30. Hence, an inboard portion of the diffuser segment 20 is bonded to the back surface of the balance element 30, and an outboard portion of the diffuser segment 20 is not bonded to (or covered by) the balance element.

Figure 4:
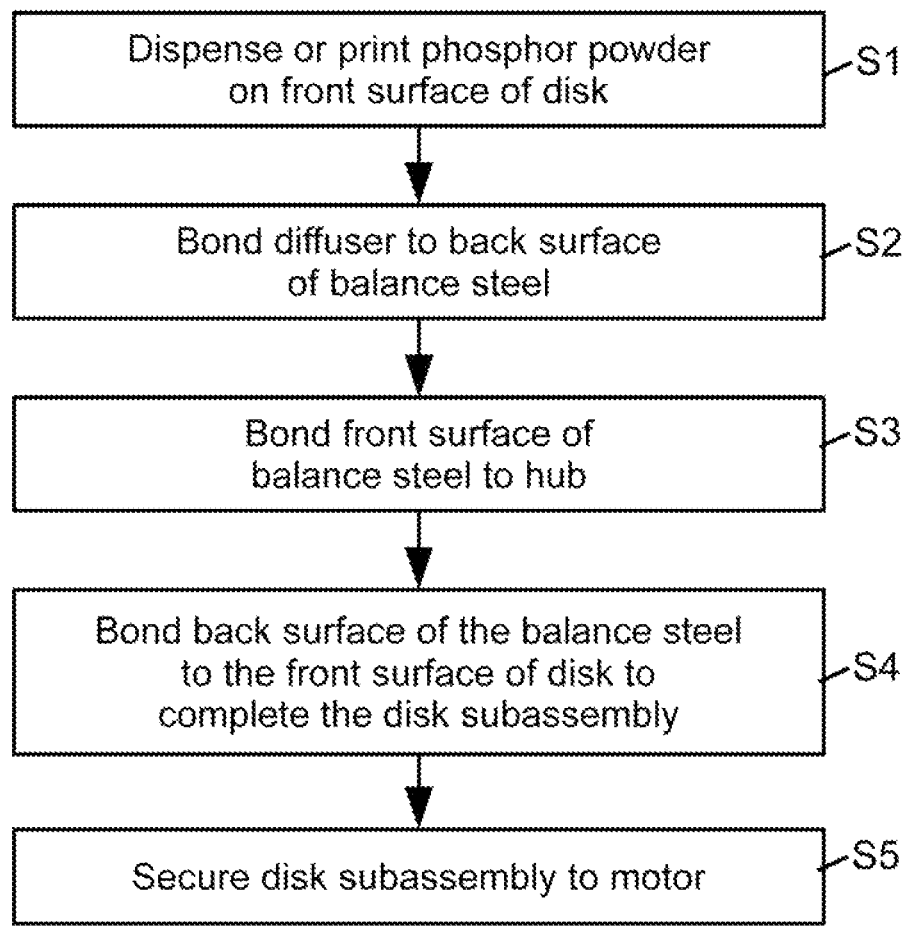
FIG. 4 diagrammatically shows a suitable assembly method for assembling the luminescent wheel of FIGS. 1-3.

With continuing reference to FIGS. 1-3 and with further reference to FIG. 4, a suitable assembly method for assembling the luminescent wheel of FIGS. 1-3 is described. In an operation S1, phosphor powder in a silicone or other suitable matrix is dispensed or printed onto the front surface of the disk 14 to form the at least one fluorescent segment 22. Other manufacturing approaches for forming the at least one fluorescent segment 22 are contemplated, such as preforming molded fluorescent segments and then bonding them to the front surface of the disk 14 using silicone adhesive or the like. In an operation S2, the diffuser segment 20 is bonded to the back surface of the balance steel 30. In an operation S3, the front surface of the balance steel 30 is bonded to the hub 16, with the opening 32 of the balance steel 30 aligned with the opening of the hub 16. In an operation S4, the back surface of the balance steel 30 is bonded to the front surface of the disk 14, thereby forming a disk subassembly including the disk 14 with bonded fluorescent segment(s) 22, the balance steel 30 with the diffuser segment 20 bonded to the balance steel, and the hub 16 bonded to the balance steel 30. In an operation S5, the disk subassembly is secured to the motor 12. This operation can employ various approaches. In one approach, the hub 16 is a threaded nut that threads onto mating threads of the driveshaft 13 of the motor 12. In another approach, the driveshaft 13 includes a planar portion that is bonded by adhesive to the back surface of the disk 14. Other approaches are contemplated.

The luminescent wheel of FIGS. 1-3 has certain advantages. By not bonding the diffuser segment 20 directly to the disk 14 (rather, the diffuser segment 20 is bonded to the balance steel 30), heat is not transferred (or at most is weakly transferred) to the disk 14 during the time interval in which the beam spot 24 impinges on the diffuser segment 20. Furthermore, the luminescent wheel of FIGS. 1-3 is easily balanced by adjusting the mass of the balance steel 30. Furthermore, the design (particularly the sector cutaway 18) allows the diffuser segment 20 to be in the same plane as the disk 14, which reduces or eliminates undesired laser beam reflection at the edge of the diffuser segment 20, and furthermore the diffuser segment 20 does not protrude from the surface of the disk 14 which could introduce air turbulence that could adversely affect stable rotation of the luminescent wheel.

It is to be appreciated that the illustrative luminescent wheel 10 just described is an example. The luminescent wheel 10 may be employed in any reflective luminescent wheel-based sequential color illumination system. In such a system, the laser may impinge upon the optical ring at normal incidence, or at an angle. Moreover, it is contemplated to employ the disclosed diffuser 20 in other optical applications besides a luminescent wheel.

Figure 5:
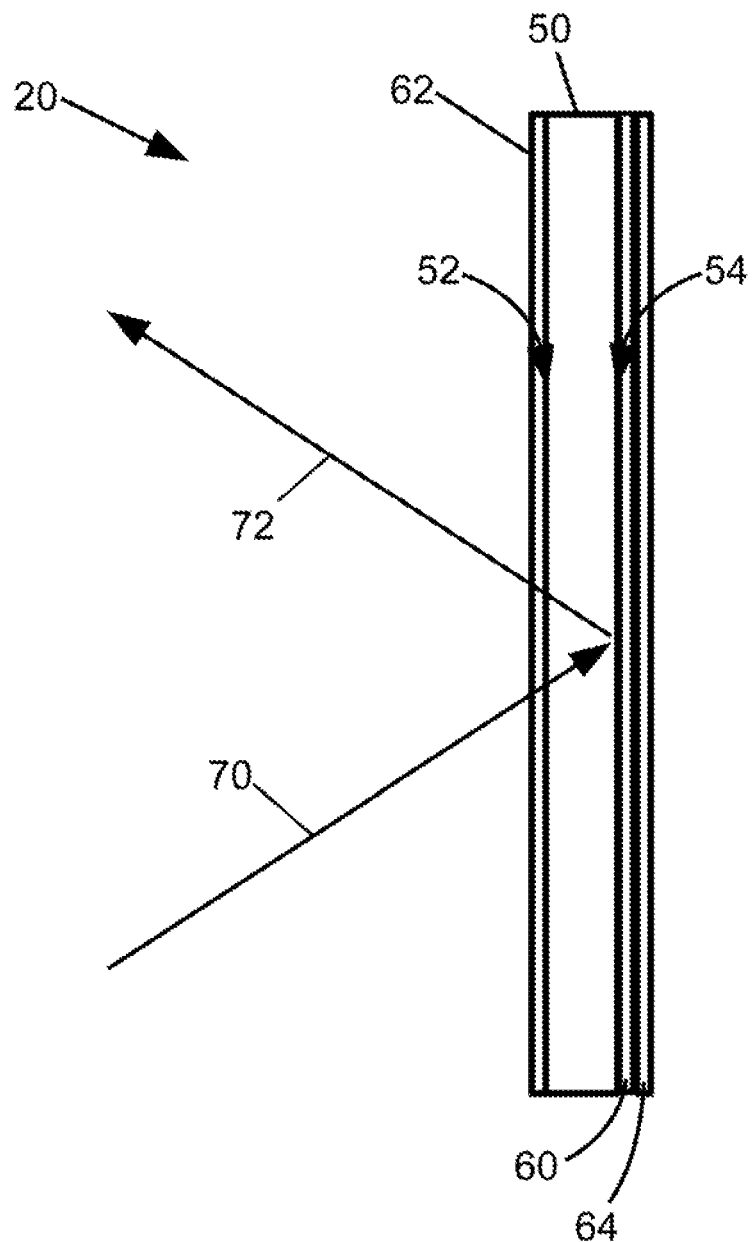
FIG. 5 diagrammatically shows a side view of the reflective diffuser of FIGS. 1-3.

With reference now to FIG. 5, the diffuser segment 20 is described in further detail. FIG. 5 shows a side-sectional view of the diffuser 20. (Note, the terms "diffuser" 20 and "diffuser segment" 20 are used interchangeably herein. The diffuser 20 is a diffuser segment 20 when used as a segment of the optical ring of the luminescent wheel 10, but more generally the diffuser 20 may be used in other optical systems). In general, each diffuser segment (or, more generally, a diffuser) 20 includes a transparent diffuser substrate 50 having a first (i.e. front) side 52 distal from the disk 12 and a second (i.e. back) side 54 proximal to the disk 12, and a reflective film 60 coated onto the second (i.e. back) side 54 of the transparent diffuser substrate 50. Note that the reference numbers 52, 54 indicating the respective first (i.e. front) and second (i.e. back) sides are only shown in FIG. 5. The transparent diffuser substrate 50 is transparent at the excitation wavelength, i.e. is transparent for the laser light of the impinging laser beam 24 (see FIG. 2). The transparent diffuser substrate 50 may, for example, be a glass substrate, a quartz substrate, or a ceramic substrate that is transparent at the excitation wavelength. The transparent diffuser substrate 50 has microstructures (not shown) disposed on or formed into the first side 52 of the transparent diffuser substrate 50, which are configured to de-speckle the laser light at the excitation wavelength. The microstructures are suitably formed using any known approach for fabricating de-speckling microstructures. The microstructures may, for example, be formed on the first side 52 of the transparent diffuser substrate 20 by chemical, mechanical, chemimechanical, or holographic etching of the first side 52 of the transparent diffuser substrate 50, or by a transfer process in which a thin layer of microstructures created using a preformed mold is transferred onto the first side 52 of the transparent diffuser substrate 50. When the laser light is irradiated on the diffuser 20, the microstructures change the scattering direction and light path of the laser to eliminate the interference characteristics of the laser and achieve the purpose of reducing or eliminating speckles. The microstructures are non-planar microstructures, and are preferably although not necessarily random or pseudorandom or disordered microstructures.

Advantageously, the reflective film 60 coated onto the second (i.e. back) side 54 of the transparent diffuser substrate 50 provides a highly reflective interface which improves optical efficiency. The reflective film 60 may, for example, comprise a metal coating or dielectric layer stack tuned to reflect the laser light at the excitation wavelength. In some preferred embodiments, an optical interface is defined at a junction of the second side 54 of the transparent diffuser substrate 50 and the reflective film 60 which has a reflectivity of at least 96% for the laser light, and more preferably has a reflectivity of at least 97% for the laser light, and even more preferably has a reflectivity of at least 98% for the laser light.

To even further enhance the optical efficiency, an anti-reflection (AR) coating 62 is optionally disposed on the first side 52 of the transparent diffuser substrate 50 (thereby coating the de-speckling microstructures). The AR coating 62 is preferably thin compared with the dimensions of the microstructures, e.g. the AR coating 62 may have a thickness of a few nanometers to a few tens of nanometers, although a higher thickness is also contemplated. The AR coating 62 is anti-reflective for the laser light at the excitation wavelength. The AR coating 62 may be an index-matching coating that smooths the refractive index step between the ambient air and the glass, quartz, or other material of the transparent diffuser substrate 50. In other embodiments, the AR coating 62 is a dielectric layer stack tuned to have near-zero reflectivity for the laser light.

In some embodiments an extinction layer 64 is coated onto the reflective film 60. The optional extinction layer 64 is configured, by way of the opacity of the material making up the extinction layer 64 and thickness, to block the laser light. For example, the extinction layer 64 may comprise a metal coating (for example, an aluminum or aluminum alloy coating, a chromium or chromium alloy coating, or so forth) or an extinction ink (optionally matching the refractive index of the reflective film 60).

With continuing reference to FIG. 5, operation of the diffuser 20 is as follows. Incoming laser light 70 impinges on the first side 52 of the diffuser 20. The laser light passes through the first side 52 where it is de-speckled by the microstructures, then passes through the transparent diffuser substrate 50 to the second side 54 where it is reflected by the reflective film 60, passes back through the transparent diffuser substrate 50 back to the first side 52 where it again interacts with the microstructures, and exits from the first side 52 as reflected laser light 72. It should be noted that while FIG. 5 illustrates the incoming laser light 70 as being incident at a non-normal angle, it is alternatively contemplated to have the laser light being incident at a normal angle, in which case the reflected laser light will follow the same trajectory as the incoming laser light (although directed in the opposite direction).

By contrast to the design of FIG. 5, in a conventional luminescent wheel design, the diffuser is mounted onto the disk and does not include the layers 60, 62 of the diffuser 20 of FIG. 5. Hence, operation as a reflective diffuser in such a conventional luminescent wheel design relies on the reflective surface of the disk. The laser light after passing through the transparent diffuser substrate would then pass unimpeded through adhesive that bonds the diffuser to the disk, and would then be reflected off the reflective surface of the disk. As previously noted, the transmissivity of silicone adhesive is about 98%, and the reflectivity of the disk is typically about 95%, so that the total efficiency in this case is only 95%×(2×98%), i.e. about 91%.

By contrast, in the diffuser 20 of FIG. 5, the optical interface defined at a junction of the second side 54 of the transparent diffuser substrate 50 and the reflective film 60 preferably has a reflectivity of at least 96% for the laser light, and more preferably has a reflectivity of at least 97%, and even more preferably a reflectivity of at least 98%. These values are readily achievable because the metal or dielectric stack is directly coated onto the second surface 54 of the transparent diffuser substrate 50, providing intimate contact at that interface and eliminating the passage of the light through any adhesive.

The optional extinction layer 64, if provided, ensures that essentially no laser light passes through the diffuser 20. This is beneficial because the laser irradiation can be of high intensity. For example, in some embodiments the laser light irradiates at a laser energy density of 500 W/mm$^2$ or higher. The reflective film 60 and extinction layer 64 should be sufficiently thick to withstand this energy input, and separating the reflectivity aspect and the laser light absorption aspects into separate layers 60, 64 can simplify design to achieve these design constraints. However, if the reflective film 60 is sufficiently opaque (e.g. sufficiently thick) then the reflective film 60 may also serve to essentially completely extinguish the laser beam, in which case the additional extinction layer 64 may be suitably omitted.

A further advantage of employing the disclosed diffuser segment 20 in the luminescent wheel 10 is that the total mass of the diffuser segment 20, including the transparent diffuser substrate 50 and the additional layers 60, 64, can be comparable with the masses of the fluorescent segments 22. This assists in balancing the luminescent wheel 10.

Figure 6:
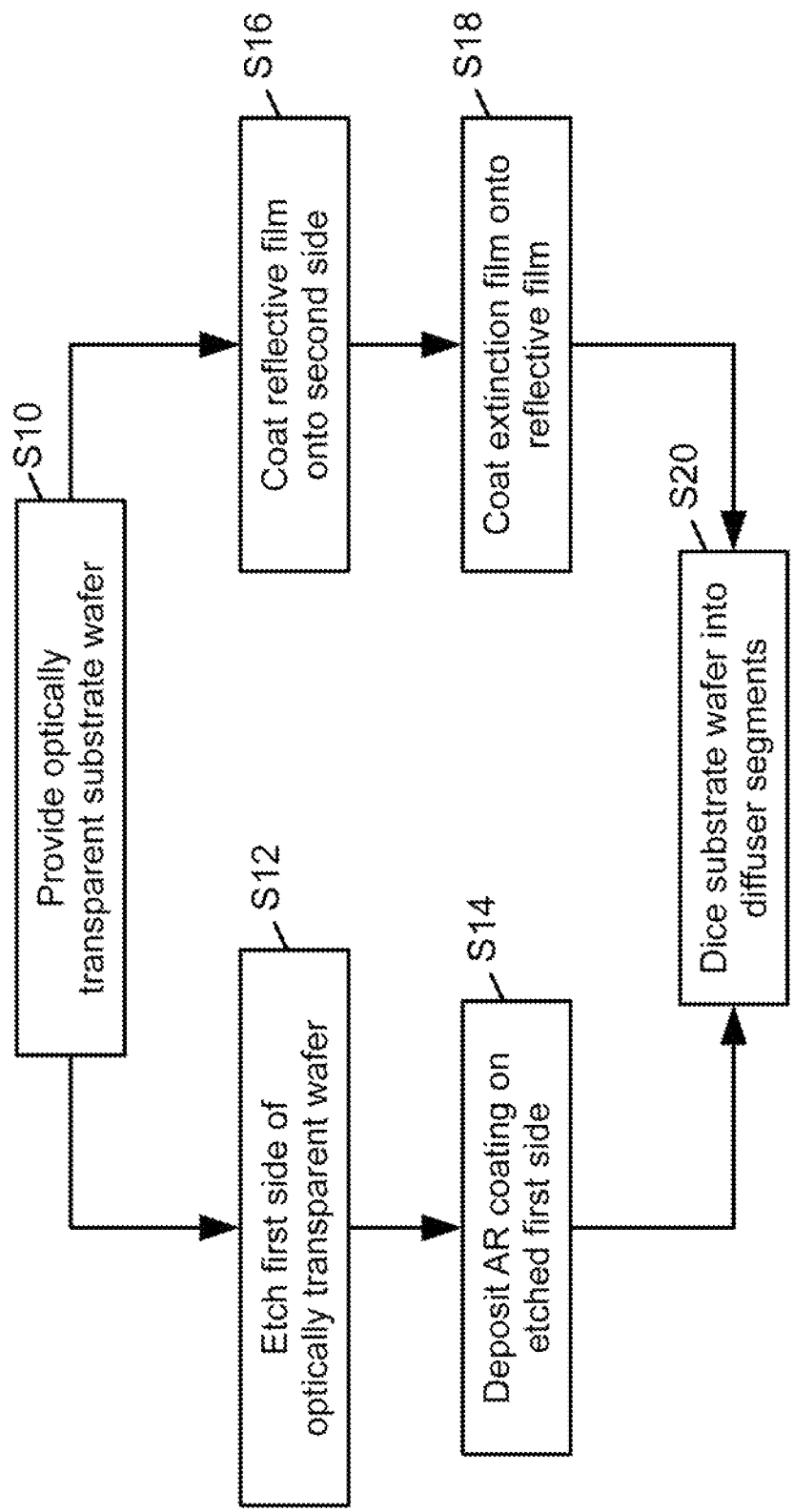
FIG. 6 diagrammatically shows a suitable manufacturing method for manufacturing the reflective diffuser.

With reference now to FIG. 6, an illustrative method for fabricating the reflective diffuser 20 of FIG. 5 (used, for example, in the luminescent wheel of FIGS. 1-3) is described. In an operation S10, an optically transparent substrate wafer is provided. The wafer is made of glass, quartz, a light transmissive ceramic, or other material suitable for use as the transparent diffuser substrate. In an operation S12, the microstructures are etched (or otherwise formed) on or in the first side of the wafer, and in an optional operation S14 the AR coating is deposited (e.g. by vacuum evaporation, sputter deposition, or so forth). In an operation S16, the reflective film is coated onto the second side of the wafer (e.g. by vacuum evaporation, sputter deposition, or so forth), and in an optional operation S18 the extinction film is deposited onto the reflective film (e.g. by vacuum evaporation, sputter deposition, or so forth). In some implementations, the reflective film and the extinction film may be deposited in a single vacuum evaporation or sputter deposition run without breaking vacuum of the deposition chamber between the two depositions. Finally, in an operation S20 the substrate wafer is diced to form diffuser segments, e.g. using a mechanical saw, laser cutting, or the like.

The present disclosure has been described with reference to exemplary embodiments. Obviously, modifications and alterations will occur to others upon reading and understanding the preceding detailed description. It is intended that the present disclosure be construed as including all such modifications and alterations insofar as they come within the scope of the appended claims or the equivalents thereof.

The invention claimed is:

1. A diffuser for de-speckling laser light, the diffuser comprising:
   a transparent diffuser substrate having a front side and a back side opposite the front side, wherein the transparent diffuser substrate is transparent for the laser light;
   microstructures disposed on or formed into the front side of the transparent diffuser substrate and configured to de-speckle the laser light;

a reflective film coated onto the back side of the transparent diffuser substrate; and
an extinction layer coated onto the reflective film and configured to block the laser light,
wherein an optical interface defined at a junction of the back side of the transparent diffuser substrate and the reflective film has a reflectivity of at least 96% for the laser light.

2. The diffuser of claim 1 wherein the reflective film comprises a metal coating or dielectric layer stack tuned to reflect the laser light.

3. The diffuser of claim 1 wherein the extinction layer comprises a metal coating or an extinction ink.

4. The diffuser of claim 1 further comprising:
an anti-reflection (AR) coating disposed on the front side of the transparent diffuser substrate that is anti-reflective for the laser light, wherein the AR coating is disposed over the microstructures thereby coating the microstructures.

5. The diffuser of claim 1 wherein the reflective film and extinction layer have a thickness configured to withstand energy input by laser light that irradiates at a laser energy density of at least 500 W/mm$^2$.

6. The diffuser of claim 4 wherein the AR coating is thin compared to dimensions of the microstructures and has a thickness of a few nanometers to a few tens of nanometers.

7. A luminescent wheel comprising:
a disk that is connectable with a motor to rotate the disk;
an optical ring secured to the disk so as to rotate with the disk, the optical ring including one or more fluorescent segment-segments and a diffuser segment; and
a balance element bonded to the disk and to the diffuser segment,
wherein at least one fluorescent segment is configured to convert laser light to converted light having a different spectrum than the laser light, and
wherein the diffuser segment is configured to de-speckle and reflect the laser light, the diffuser segment including:
a transparent diffuser substrate having a front side and a back side opposite the front side, wherein the transparent diffuser substrate is transparent for the laser light;
microstructures disposed on or formed into the front side of the transparent diffuser substrate and configured to de-speckle the laser light; and
a reflective film coated onto the back side of the transparent diffuser substrate.

8. The luminescent wheel of claim 7 wherein the diffuser segment is not directly bonded to the disk.

9. The luminescent wheel of claim 7 wherein:
the balance element is secured to the disk;
the disk has a sector cutaway into which the diffuser segment fits so that the diffuser segment and the disk are coplanar; and
the diffuser segment has an inboard portion and an outboard portion, the inboard portion of the diffuser segment is proximal to a center of the disk and the outboard portion of the diffuser segment is distal from the center of the disk, wherein the inboard portion of the diffuser segment is bonded to a back surface of the balance element and the outboard portion of the diffuser segment is not bonded to or covered by the balance element.

10. The luminescent wheel of claim 7 further comprising:
an extinction layer coated onto the reflective film and configured to block the laser light.

11. The luminescent wheel of claim 10 wherein the extinction layer comprises a metal coating or an extinction ink.

12. A luminescent wheel comprising:
a disk that is connectable with a motor to rotate the disk; and
an optical ring secured to the disk so as to rotate with the disk, the optical ring including one or more fluorescent segments and a diffuser segment;
wherein at least one fluorescent segment is configured to convert laser light at an excitation wavelength to converted light; and
wherein the diffuser segment includes:
a transparent diffuser substrate having a front side and a back side opposite the front side, wherein the transparent diffuser substrate is transparent for laser light at the excitation wavelength; and
a reflective film coated onto the back side of the transparent diffuser substrate,
wherein an optical interface defined at a junction of the back side of the transparent diffuser substrate and the reflective film has a reflectivity of at least 96% for the laser light at the excitation wavelength.

13. The luminescent wheel of claim 12 wherein the diffuser segment further includes:
microstructures disposed on or formed into the front side of the transparent diffuser substrate and configured to de-speckle the laser light at the excitation wavelength.

14. The luminescent wheel of claim 13 wherein the diffuser segment further includes:
an anti-reflection (AR) coating disposed on the front side of the transparent diffuser substrate that is anti-reflective for the laser light at the excitation wavelength, wherein the AR coating is disposed over the microstructures thereby coating the microstructures.

15. The luminescent wheel of claim 12 wherein the reflective film comprises a metal coating or dielectric layer stack tuned to reflect the laser light at the excitation wavelength.

16. The luminescent wheel of claim 12 wherein the diffuser segment further includes:
an extinction layer coated onto the reflective film and configured to block the laser light at the excitation wavelength, wherein the extinction layer comprises a metal coating or an extinction ink.

17. The luminescent wheel of claim 12 wherein the disk has a sector cutaway aligned with the diffuser segment, the luminescent wheel further comprising:
a balance element bonded to the disk and to the diffuser segment, wherein the diffuser segment is not directly bonded to the disk.

18. The luminescent wheel of claim 17 wherein the diffuser segment has an inboard portion and an outboard portion, wherein the inboard portion of the diffuser segment is proximal to a center of the disk and the outboard portion of the diffuser segment is distal from the center of the disk, and wherein the inboard portion of the diffuser segment is bonded to a back surface of the balance element and the outboard portion of the diffuser segment is not bonded to or covered by the balance element.

19. The luminescent wheel of claim 12 further comprising:
a motor operatively connected with the disk to rotate the disk.

20. The luminescent wheel of claim 19 further comprising:

a laser configured to emit the laser light at the excitation wavelength that impinges upon the optical ring.

21. The luminescent wheel of claim 16 wherein the reflective film and extinction layer have a thickness configured to withstand energy input by laser light that irradiates at a laser energy density of at least 500 W/mm$^2$.

* * * * *